United States Patent [19]

Baker

[11] 4,333,136
[45] Jun. 1, 1982

[54] SOLAR POWERED AUTOMATIC TURN-ON CONTROL (SPA-TOC) UNIT AND METHOD

[76] Inventor: Richard H. Baker, 26 Wildwood Dr., Bedford, Mass. 01730

[21] Appl. No.: 97,205

[22] Filed: Nov. 26, 1979

[51] Int. Cl.$^3$ .......................... H02P 13/18; G05F 5/00
[52] U.S. Cl. ....................................... 363/43; 136/293; 307/87; 363/49
[58] Field of Search ...................... 323/15; 307/23, 24, 307/29, 39, 87; 363/42, 43, 49, 95; 136/291, 293; 318/802, 806, 811; 320/2, 63

[56] References Cited

U.S. PATENT DOCUMENTS

| | | | |
|---|---|---|---|
| 3,648,145 | 3/1972 | Meyer et al. | 320/13 |
| 3,740,636 | 6/1973 | Hogrefe et al. | 320/2 |
| 3,919,618 | 11/1975 | Coleman et al. | 320/39 |
| 4,186,336 | 1/1980 | Weinberg et al. | 323/15 |
| 4,204,147 | 5/1980 | Larrabee | 323/15 |

FOREIGN PATENT DOCUMENTS

| | | |
|---|---|---|
| 2022942 | 12/1971 | Fed. Rep. of Germany . |
| 2433356 | 1/1976 | Fed. Rep. of Germany . |
| 1424383 | 2/1976 | United Kingdom . |

OTHER PUBLICATIONS

Power Conditioning Specialists Conference Record, 1970, pp. 6–11 and pp. 128–138.
Proceedings, 2nd European Community Photovoltaic Solar Energy Conference, Berlin, Apr. 23–26, 1979, pp. 570–583.
Conference Record, 13th IEEE Photovoltaic Specialists Conf., Jun. 5–8, 1978, pp. 984–991.
Conference Record, 12th IEEE Photovoltaic Specialists Conf., Nov. 15–18, 1976, pp. 705–714.

Primary Examiner—William H. Beha, Jr.

[57] ABSTRACT

Orderly control of power applied by a photovoltaic solar panel d.c. source to a load is attained despite varying long and short term solar conditions by coupling power from the panel to an inverter in response to the panel voltage exceeding a predetermined level and preventing coupling of power from the panel to the inverter in response to the panel voltage being less than a predetermined level. The switching frequency of the inverter is controlled in response to the panel voltage so that approximately maximum power which the panel is capable of generating is supplied to the inverter for the incident solar energy on the panel at a given temperature. Power is supplied to the inverter by a series switch between the panel and inverter. The switch is activated into a conducting state in response to the panel voltage exceeding a predetermined value. The panel voltage controls the turn-on and turn-off levels of the series switch by a hysteresis effect, provided by connecting a dummy power dissipating load in shunt with the panel while the series switch is cut off. The dummy load has a value causing the panel output voltage to be less than the voltage for maximum panel output power. A similar series switch and hysteresis control is provided for control circuitry for the inverter. The series switch for supplying power to the control circuitry can be activated in response to the same voltage which activates the series switch for the inverter, or in response to a different voltage level.

27 Claims, 4 Drawing Figures

SOLAR POWERED AUTOMATIC TURN-ON CONTROL (SPA-TOC) UNIT AND METHOD

TECHNICAL FIELD

The present invention relates generally to a system and circuit for controlling the power applied by a photovoltaic solar panel d.c. source to a load, and more particularly, to such a system and circuit wherein a series switch between the panel and the load is selectively opened and closed in response to the voltage level derived from the panel.

BACKGROUND ART

The voltage derived from a photovoltaic solar panel d.c. source is a function of the sunlight incident on the panel and the temperature of the panel. Therefore, the voltage derived from the panel is highly variable due to the long and short term variations of solar energy incident on the panel. The available power per unit area of the solar panel goes from a nocturnal value of zero to a maximum value at the middle of a sunny day. The power derived from the panel may have a relatively constant value during the entire daytime hours on hazy days. The power derived from the panel can also have sudden variations due to clouds transiently in the field of view of the panel to the sun.

Solar panel systems are presently being designed wherein a load is driven directly by the panel output voltage without the intermediary of an energy storage device, such as a rechargeable battery. Such systems usually include, for efficient operation, a chopping d.c. to a.c. inverter, with associated control circuitry. One particularly advantageous chopper is disclosed in my copending, commonly assigned application, Ser. No. 846,696, filed Oct. 31, 1977, entitled "Synthesizer Circuit for Generating Three-Tier Wave Forms," now U.S. Pat. No. 4,135,235, wherein a pseudo-sinusoidal, notched, multilevel waveform is derived from a d.c. source and supplied to an a.c. load, such as a synchronous motor. This inverter, preferably controlled by a variable frequency function generator as disclosed in the commonly assigned application Ser. No. 890,460 of Baker et al., filed Mar. 27, 1978, entitled "Controller for Synthesizer Circuit for Generating Three-Tier Wave Forms," now U.S. Pat. No. 4,167,775, is such that the power output and current supplied from the d.c. source to the a.c. load increase proportionately with fundamental chopping frequency of the inverter. It is desired to supply maximum power from the panel to the inverter and to a load. However, the maximum power which can be derived from the panel is variable, as indicated above.

For any particular incident solar energy level at a given temperature, the output power of the panel is a function of the panel load, which in turn controls the panel output voltage and current. The output of a photovoltaic solar panel can thus be represented as a family of curves for the panel voltage versus current output parameters. The open circuit voltage and short circuit current of each curve in the family both increase the level of incident solar energy on a panel increases for a given temperature. Each of the curves has a maximum power point, at which the curve has a slope of minus one. Each of the curves has slopes with absolute values greater than one and less than one for currents respectively greater than and less than the maximum power point.

Equipment to track the maximum available power from the panel and to control the chopping frequency of the inverter in response thereto must be shut down in an orderly fashion when the available power from the solar panel is reduced below some minimum value necessary to maintain control of the inverter. Also, in day-night and night-day transitions, it is necessary to remove power from the inverter and control circuitry and supply power to the control circuitry and inverter in an orderly manner, while always insuring that sufficient control power exists to meet stability requirements of the inverter and the load.

It is, accordingly, an object of the present invention to provide a new and improved circuit and system for providing orderly control of the power applied by a photovoltaic solar panel d.c. source to a load despite varying long and short term solar conditions of the panel.

Another object of the invention is to provide a system and circuit for controllig the power applied by a photovoltaic solar panel d.c. source to an inverter having a chopping frequency controlled so that maximum available power from the panel is supplied to the inverter and orderly control for the turn-on and turn-off of the inverter and control circuitry therefore is provided.

An additional object of the invention is to provide a new and improved system and circuit for selectively supplying power from a photovoltaic solar panel d.c. source to a main load and control circuitry for the load.

DISCLOSURE OF INVENTION

In accordance with one aspect of the present invention, a system for providing orderly control of the power applied by a photovoltaic solar panel d.c. source to a load includes means for coupling power from the panel to an inverter that drives the load and for preventing the coupling of power from the panel to the inverter in response to the voltage level of the panel being respectively greater than a predetermined value and less than a predetermined value. The coupling means is utilized in combination with an inverter control circuit that is responsive to the voltage from the source to control the switching frequency of the inverter so that approximately maximum power is supplied by the panel to the inverter for the incident solar energy and temperature of the panel. The inverter control circuit requires appreciably less power than the load and includes an input power supply terminal that is selectively connected to the output of the photovoltaic solar panel d.c. source. The control circuit power supply terminal is selectively connected to the panel so that power is coupled to the terminal or decoupled from the terminal depending upon the voltage derived from the panel.

To prevent short term solar conditions of the panel which result in relatively short transitory fluctuations of the panel output voltage from adversely affecting the performance of the inverter and control circuitry for the inverter, the coupling of power to the inverter and the control circuitry is provided with voltage hysteresis. Thereby, in order to change the state of a switch that couples power from the panel to the inverter and a second switch which couples power from the panel to the control circuitry, the panel voltage must drop below a level that initially causes the switches to be activated into a conducting state. The hysteresis is provided by a pair of dummy loads that are connected in a shunt with the panel only while the switches are in a cut-off condition. While the dummy loads are connected in shunt with panels, they reduce the output voltage of the panel until the panel is responsive to a predetermined level of solar energy at a particular temperature. In response to the panel responding to the predetermined amount of solar energy, at the particular temperature, the switches are activated and the dummy loads are disconnected from the panel. Thereby, power is available from the panel which can be applied to the inverter and an actual load, rather than to the dummy loads. Disconnecting the dummy loads from the panel enables the panel voltage to increase above a threshold value at which the switches connected to the inverter and the inverter control circuitry are activated to a closed condition. These switches are not returned to an open circuit condition until the panel voltage drops below the threshold value.

Hence, in accordance with a further aspect of the invention, there is an apparatus for and method of controlling the application of d.c. output power of a photovoltaic solar panel to a load wherein a determination is made as to whether a panel output parameter value is above or below a predetermined threshold. In response to the output parameter value being below the threshold, the panel is loaded with an impedance that causes the panel to derive the output parameter with a value different from the parameter value at the maximum power point for the panel at the threshold while the panel is decoupled from the load. In response to the output parameter being above the threshold, the panel is coupled to the load while the panel is operated substantially at the maximum power.

In accordance with another aspect of the invention, there is an apparatus for and method of controlling the application of d.c. output power of a solar panel to a load wherein an output parameter of the panel is monitored to indicate whether the solar energy incident on the panel is above or below a threshold value. In response to the parameter indicating that the incident energy is below the threshold, a dummy load is connected to the panel while the coupling of power from the panel to the load is prevented. The dummy load causes the output power of the panel to differ from the panel maximum power at the threshold value of the incident energy. In response to the parameter indicating that the incident energy is above the threshold, the dummy load is disconnected from the panel while power from the panel is coupled to the load and the power output of the panel is maximized.

The hysteresis effect of the present invention relies upon the family of curves for the voltage versus current output parameters of the panels. In particular, the power supplied by the panel to the load is controlled by monitoring one of the output parameters (voltage or current) of the panel to indicate whether the solar energy incident on the panel is above or below a reference value. In the particular embodiment described in detail, the parameter is the output voltage of the panel, although it is to be understood that the output current of the panel can also be monitored. Also, the reference value is proportional to the panel d.c. output voltage. In response to the parameter indicating that the incident energy is below the threshold, the dummy load is connected to the panel, and the series switch between the panel and the load is open circuited, to prevent the coupling of power from the panel to the load. In the particular embodiment, the dummy load causes the panel to operate along the portion of the curve having a slope greater than one. If, however, current is monitored, the dummy load causes the panel to operate along the portion of the curve where the slope of the curve is less than one. In any event, the dummy load causes the output power of the panel to differ from the panel maximum power at the threshold value of the incident energy. In response to the parameter indicating that the incident energy is above the threshold, the dummy load is disconnected from the panel. Simultaneously, power from the panel is coupled to the load. The current or voltage supplied to the load is then adjusted so that maximum power is supplied by the panel to the load. Because the maximum power point is at a panel voltage above the panel voltage which causes the dummy load to be connected in circuit or is less than the current which causes the dummy load to be connected in the circuit, hysteresis is automatically provided by controlling the inverter so it has a chopping frequency which causes maximum power to be supplied to the load and by judicious selection of the magnitude of the dummy loads.

It is accordingly, still another object of the present invention to provide a system and circuit for selectively supplying power from a photovoltaic solar panel d.c. source to a load by a switching apparatus having improved hysteresis control.

The above and still further objects, features and advantages of the present invention will become apparent upon consideration of the following detailed description of several specific embodiments thereof, especially when taken in conjunction with the accompanying drawings.

BEST MODE OF CARRYING OUT THE INVENTION

Figure 1:
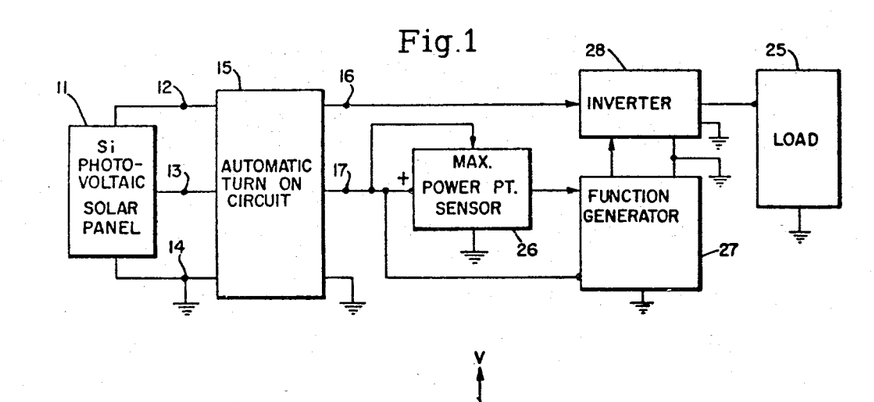
FIG. 1 is a system block diagram in accordance with a preferred embodiment of the invention.

Reference is now made to FIG. 1 of the drawings wherein a silicon photovoltaic solar panel 11 is illustrated as including a high voltage output terminal 12, an intermediate output terminal 13, and a ground terminal 14. The d.c. voltage developed by solar panel 11 at terminals 12 and 13 is variable, depending upon the amount of incident solar energy and the temperature of the panel. In one preferred embodiment, the maximum voltages developed by panel 11 at terminals 12 and 13 are respectively 85 and 29 volts, relative to terminal 14.

Figures 3, 4:
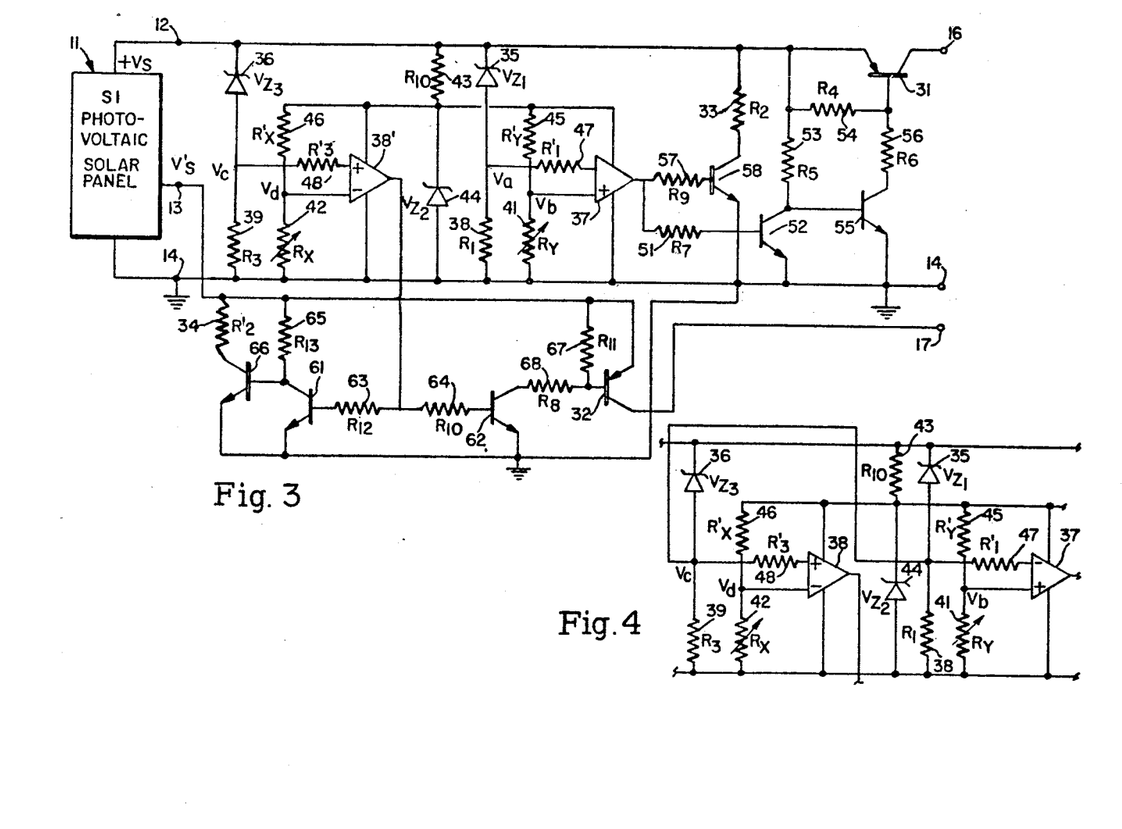
FIG. 3 is a circuit diagram of the automatic turn-on circuit illustrated in FIG. 1, in accordance with one embodiment.
FIG. 4 is a circuit diagram of a portion of a modified version of the automatic turn-on circuit.

The voltages at terminals 12 and 13 are applied to input terminals of automatic turn-on circuit 15, described in detail in different embodiments, in connection with FIGS. 3 and 4. Circuit 15 responds to the voltage at terminal 12 to selectively couple the voltages at terminals 12 and 13 to output terminals 16 and 17. In one embodiment, the voltages at terminals 12 and 13 are coupled to terminals 16 and 17 by separate series switches in turn-on circuit 15 in response to the voltage at terminal 12 exceeding a single predetermined value. In a second embodiment, the voltages at terminals 12 and 13 are coupled to terminals 16 and 17 in response to the voltage at terminal 12 having two different values. If the latter embodiment is employed, it is generally preferable for the voltage at terminal 13 to be supplied to terminal 17 in response to the voltage at terminal 12 having a somewhat lower value than is required to enable the voltage at terminal 12 to be coupled to terminal 16. In both embodiments, the two series switches in circuit 15 between terminals 12 and 16 and between terminals 13 and 17 have voltage hysteresis characteristics. Thereby, terminals 12 and 16 and terminals 13 and 17 are connected to each other in response to the voltage at terminal 12 exceeding a threshold value, $V_t$ (for the single threshold situation) or $V_{t1}$ and $V_{t2}$ (for the situation of separate thresholds) by a predetermined value, $\Delta V$. Terminals 12 and 16 and terminals 13 and 17 remain connected together until the voltage at terminal 12 drops below the threshold value. Thereby, relatively high frequency transient variations in the output voltage and power of solar panel 11, as occur in response to clouds, passing aircraft, and debris being in the field of view between the solar panel and the sun, do not cause the switches in circuit 15 to change state once the switches are activated into a conducting state.

Figure 2:
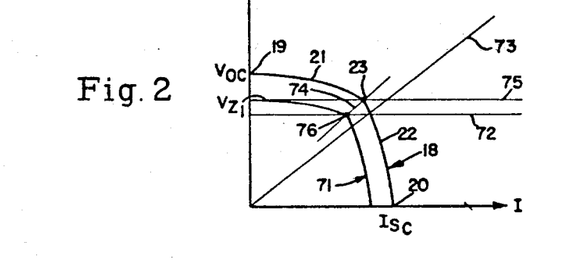
FIG. 2 are curves indicating the voltage-current characteristics of the output of a solar panel illustrated in FIG. 1 for two particular levels of incident solar energy and temperature.

For any particular temperature and incident solar energy condition of solar panel 11, the solar panel has a predetermined voltage versus current characteristic. Curve 18, FIG. 2, is an illustration of the voltage versus current characteristic of solar panel 11 for one particular temperature and incident solar energy situation. Curve 18 has a maximum voltage value ($V=V_{co}$) and zero current value ($I=0$) at point 19 when no load is connected across the solar panel terminals 12 and 14. In response to a short circuit being connected between terminals 12 and 14, the output voltage of the solar panel drops to zero and maximum current, $I_{sc}$, is derived from the panel, as indicated by point 20 on curve 18. Curve 18 includes a first portion 21 having a negative slope less than one extending from point 19 to maximum power point 23 and a second portion 22 having a negative slope greater than one between points 19 and 23. Portions 21 and 22 meet at maximum power point 23 where the slope is minus one and the product of the output voltage and current of panel 11 is a maximum. It is desirable to maintain the voltages supplied by panel 11 to a load at the maximum power point 23. For differing temperatures and incident solar energy conditions of panel 11, the position of point 23 varies.

To enable panel 11 to provide maximum power to load 25, typically an inductive load such as a synchronous motor, the voltage at output terminal 17 of circuit 15 is sampled by maximum power point sensor 26. In response to the output voltage of circuit 15 at terminal 17, sensor 26 derives a d.c. voltage which is applied to function generator 27, preferably of the type illustrated in the previously mentioned application, Ser. No. 890,460. Function generator 27 responds to the d.c. output of sensor 26 to provide a variable frequency input to power inverter 28 that chops the d.c. voltage at terminal 16 into a multi-level, notched pseudo sinusoidal squarewave that is applied to load 25. In one preferred embodiment, inverter 28 is of the type illustrated in the previously mentioned application, Ser. No. 846,696. In one preferred embodiment, maximum power point sensor 26 is of the type described and illustrated in my copending, commonly assigned application entitled "Solar Powered Automatic Maximum Power Tracking System," Exxon P.M. EPCS 77-6. Ser. No. 97,204.

Maximum power is transferred between panel 11 and load 25 by utilizing sensor 26, function generator 27, and inverter 28. Inverter 28 drives motor load 25, having a constant volts per Hertz ratio, so the power and current supplied by panel 11 to inverter 28 are linearly proportional to the chopping frequency of the fundamental of the pseudo sinusoidal wave derived by the inverter. Because the maximum power available from panel 11, as determined by sensor 26, controls the fundamental frequency of function generator 27 and therefore the fundamental output frequency of inverter 28, the electric power transferred from panel 11 to load 25 is automatically maximized. Because the power supplied by panel 11 through circuit 15 to inverter 28 is linearly proportional to the fundamental chopping frequency of the inverter the inverter fundamental chopping frequency determines the amount of power and current drawn by the inverter and load from panel 11. Increasing the fundamental chopping frequency of inverter 28 therefore increases the power and current drawn from the solar panel; decreasing the fundamental chopping frequency of inverter 28 decreases the power and current drawn from the solar panel. Maximum power point sensor 26 controls the frequency supplied by generator 27 to inverter 28 in such a way that the voltage and current supplied by the panel to the input of inverter 28 are approximately at maximum power point 23. At the maximum power point, the fundamental chopping frequency of inverter 28 is stabilized. In response to the current supplied to load 25 being above and below the maximum power point, the fundamental chopping frequency is respectively above and below the stabilized chopping frequency.

Maximum power point sensor 26 and function generator 27 include relatively low power logic circuitry, powered by the output of panel 11. D.C. Power supplies in logic circuitry of sensor 26 and function generator 27 are typically at relatively low voltage values and therefore are derived from intermediate output terminal 13 of panel 11, as selectively coupled through turn-on circuit 15 to terminal 17. In one embodiment, the power supply voltage developed at terminal 17 energizes the logic circuitry within sensor 26 and function generator 27 prior to power being supplied by circuit 15 to the high power, high voltage output 16. Thereby, sensor 26 and function generator 27 are deriving output voltages at the time power is applied to terminal 16. Hence, transients in the output of function generator 27 are minimized when power is applied to terminal 16 and there is an orderly transfer of power, with a minimum of transients, when terminal 16 begins to supply load 25.

A circuit diagram of a preferred embodiment for turn-on circuit 15 is illustrated in FIG. 3. To selectively couple power between terminals 12 and 16, a Darlington PNP power transistor 31 has an emitter-collector path connected in series between the terminals. Power is selectively coupled between terminals 13 and 17 by the emitter-collector path of PNP Darlington power transistor 32. In response to the magnitude of the voltage derived by solar panel 11 between terminals 12 and 14, base electrodes for transistors 31 and 32 are selectively forward and reverse biased to close and open the series switches formed by the emitter-collector paths of the Darlington transistors. In the embodiment of FIG. 3, the emitter-collector path of transistor 32 is rendered into a conducting state in response to a lower voltage between terminals 12 and 14 than is required to provide a low impedance emitter-collector path for transistor 31.

While the emitter-collector path for transistors 31 and 32 are cut-off, dummy loads, including resistors 33 and 34, are respectively connected in shunt with terminals 12 and 13. In response to the emitter-collector path of PNP transistor 32 being activated into the conducting state, the path from terminals 13 and 14 to resistor 34 is interrupted so that the power supplied by panel 11 and dissipated by the resistor is available to be transferred by transistor 32 to terminal 17. Similarly, when the base emitter junction of transistor 31 is forward biased, the shunt path through resistor 33 is open circuited and the power dissipated by resistor 33 is available to be coupled through transistor 31 to terminal 16 and thence to inverter 28 and load 25. While resistors 33 and 34 load power supply terminals 12 and 13, the output power of the supply is less than immediately after transistors 31 and 33 are activated to the forward biased condition. Such a result is achieved by selecting resistors 33 and 34 so that the panel output voltage is less than the maximum power point, e.g., along portion 22 of curve 18. When maximim power point sensor 26 is activated, inverter 28 is opened so the output of panel 11 is at the maximum power point, e.g., point 23, whereby the panel output voltage increases. When resistors 33 and 34 are decoupled from solar panel 11, the panel voltage jumps providing a hysteresis effect. Such an effect occurs because the incident radiation on panel 11 must decrease or the panel temperature must increase by an amount sufficient to reduce the panel output voltage below the same threshold value which originally caused the system to switch transistor 31 into a conducting state.

To control switching the transistors 31 and 32 and selective loading of panel 11 by resistors 33 and 34, Zener, diodes 35 and 36, and d.c. operational amplifiers 37 and 38' are provided. Zener diodes 35 and 36 are respectively connected in series with resistors 38 and 39. Each of the series combinations of Zener diode 35 and resistor 38 and Zener diode 36 and resistor 39 is connected in a separate branch circuit shunting terminals 12 and 14 of solar panel 11. Zener diodes 35 and 36 have different threshold voltages, $V_{z1}$ and $V_{z3}$, with the value of $V_{z1}$ being greater than $V_{z3}$ in the preferred embodiment. Thereby, the branch circuit including Zener diode 36 and resistor 39 remains in a non-conducting state for a lower voltage range than the branch circuit comprising Zener diode 35 and resistor 38. In response to the threshold voltages of Zener diodes 35 and 36 being exceeded, current respectively flows through resistors 38 and 39, and there are corresponding increases in the voltages developed across these resistors from a zero level to $(V_s - V_{z1})$ and $(V_s - V_{z3})$, where $V_s$ is the d.c. voltage derived by panel 11 and supplied to terminal 12.

The voltages developed across resistors 38 and 39 are compared with reference voltages respectively developed across resistors 41 and 42. The comparisons are performed by differential non-feedback operational amplifiers 37 and 38 having bi-level outputs such that the output of each amplifier is a predetermined negative d.c. voltage in response to the voltage applied to the inverting input terminal of the amplifier being greater than the voltage applied to the non-inverting input terminal of the amplifier; in response to the voltage applied to the non-inverting input terminal being greater than the voltage applied to the inverting input terminal of the amplifier, the amplifier derives a predetermined positive d.c. output voltage. The voltages applied to resistors 41 and 42 are stabilized by a voltage regulator comprising resistor 43 and Zener diode 44, connected in series across terminals 12 and 14 of solar panel 11. A regulated d.c. voltage developed between the anode and cathode of Zener diode 44 is respectively applied to resistors 41 and 42 by resistors 45 and 46. Taps between resistors 41 and 45 and between resistors 42 and 46 are respectively connected to non-inverting and inverting input terminals of amplifiers 37 and 38. The inverting and non-inverting input terminals of amplifiers 37 and 38 are respectively connected to be responsive to the voltages developed across resistors 38 and 39; the voltages developed across the resistors are respectively coupled to the inverting and non-inverting input terminals of amplifiers 37 and 38' by resistors 37 and 48. D.C. power supply terminals of amplifiers 37 and 38 are connected to be energized by the regulated voltage between the anode and cathode of Zener diode 44. The values of resistors 38, 41, 45 and 47 are selected to provide the desired threshold characteristics of amplifier 37 in response to the threshold voltage of Zener diode 35. Similarly, the values of resistors 39, 43, 46 and 48 are selected to provide the desired transitional characteristics for the output of amplifier 38, as a function of the threshold voltage of Zener diode 36.

The bi-level output of amplifier 37 controls the switching of transistors 31, 52, 55, and 58 and therefore the selective connection of resistor 33 in shunt with terminals 12 and 14. To these ends, the output of amplifier 37 is coupled through current limiting resistor 51 to the base of NPN transistor 52, having an emitter-collector path in shunt with terminals 12 and 14. The collector of transistor 52 is connected to load resistor 53, in turn connected to resistor 54 that shunts the emitter-base path of Darlington switching transistor 31. The collector of transistor 52 is connected in d.c. circuit with the base of NPN transistor 55, having an emitter connected directly to terminal 14 and a collector connected through resistor 56 to the base of transistor 31. The output voltage of amplifier 37 is coupled by resistor 57 to the base of Darlington NPN power transistor 58 having an emitter-collector path that selectively connects resistor 33 as a load for terminals 12 and 14. Transistor 58 is connected in a common emitter mode, whereby the transistor emitter is connected to terminal 14 and the transistor collector is connected to one terminal of resistor 33, the other terminal of which is connected directly to terminal 12.

In response to the voltage at terminal 12 being less than the threshold voltage of Zener diode 35, no current flows through resistor 38 and substantially zero voltage is applied to the inverting input of amplifier 37, whereby a positive d.c. voltage is derived at the amplifier output. A positive d.c. voltage at the output of amplifier 37 forward biases transistor 58, to connect resistor 33 across terminals 12 and 14. Thereby, a very substantial percentage of the power derived by panel 11 is dissipated in resistor 33. The value of resistor 33 and the threshold voltage of Zener diode 35 are selected so that panel 11 operates along segment 22 while transistor 58 is in a forward biased condition and a voltage less than the threshold voltage of Zener diode 35 is developed between terminals 12 and 14.

While transistor 58 is forward biased, transistor 31 is back biased because the positive voltage at the output of amplifier 37 forward biases transistor 52, which in turn back biases transistor 55. The back bias of transistor 55 prevents the flow of substantial negative current to the base of transistor 31, to cut off the emitter-collector path of transistor 31.

When the voltage derived by panel 11 is slightly less than the threshold voltage of Zener diode 35, the power from the panel dissipated in resistor 33 equals approximately $(V_{z1})^2/R_2$, where $R_2$ equals the value of resistor 33. In response to the voltage of panel 11 reaching and exceeding the threshold voltage of Zener diode 35, this diode conducts current causing Va to exceed Vb in amplitude, in turn causing the sequence of amplifier 37 changing its output voltage to a zero level, turning off transistors 58 and 52. When transistor 52 so turns off, the voltage at its collector is raised towards +Vs, causing the base emitter junction of transistor 55 to be forward biased turning the latter on. Base emitter current now flows from transistor 31 through resistor 56 and the collector-emitter path of transistor 55, to a source of reference potential, ground in this example. As a result, transistor 31 is turned on, and the power formerly dissipated in resistor 33 is available to be transferred through the emitter-collector path of transistor 31 to terminal 16. Hence, there is not a very large shift in the power requirements of panel 11 at the time transistor 31 is switched from a cut off to a conducting state, resulting in relatively smooth operation of sensor 26, function generator 27 and inverter 28, at the time the inverter is supplied with d.c. power dry terminal 16.

Resistor 34 and transistor 32 are switched in response to the output of amplifier 38' in a manner somewhat similar to switching of transistor 31 and resistor 33. In response to the output voltage of solar panel 11 being less than the threshold of Zener diode 36, amplifier 38 provides an output voltage of zero volt d.c. which back biases common emitter NPN transistors 61 and 62 into a cut off state, by virtue of the connection of the bases of these transistors to the output of amplifier 38 through current limiting resistors 63 and 64, respectively. The collector of transistor 61 is connected to intermediate tap 13 of panel 11 by load resistor 65, across which is developed a voltage which is applied to the base of PNP Darlington power transistor 66. The emitter-collector path of transistor 66 is activated into a conducting state in response to the voltage across resistor 65, whereby dummy load resistor 34 is connected in shunt between terminals 13 and 14 of panel 11. Simultaneously, transistor 32 is rendered into a cut off condition because the high impedance state of the emitter-collector path of transistor 62 causes the base-emitter junction of transistor 32 to be backbiased, preventing current flow therein. To provide an appropriate load for the emitter-collector path of transistor 62, when the transistor is activated into a conducting state, resistor 68 is connected between transistor 62 and the base of power transistor 32.

In response to the voltage of solar panel 11 reaching or exceeding the threshold of Zener diode 36, the output of amplifier 38 jumps to a positive value which forward biases transistors 61 and 62. In response to transistors 61 and 62 being forward biased, the base-emitter junctions of transistors 66 and 32 are respectively back and forward biased. In response to transistor 66 being back biased, the power dissipate by resistor 34 connected between terminals 13 and 14 of solar panel 11 is turned off and this power, derived from the panel output terminal 13, is available to be supplied to the load at terminal 17; the load is now coupled to terminal 13 by way of the emitter-collector path of forward biased transistor 32. The load connected to terminal 17 comprises the control circuitry for inverter 28, namely maximum power point sensor 26 and function generator 27. The value of resistor 34 is selected so that the output of panel 11 is along the relatively high negative slope portion 22 of the panel characteristic curve 18. However, the value of resistor 34 should be selected to be as close as possible to maximum power point 23 for the minimum open circuit output voltage of the panel that is to be coupled to terminal 17. Since the load connected to terminal 17 is relatively constant, being logic control circuitry, rather than a variable, high power consuming load such as a motor, and because the voltage between terminals 13 and 14 is considerably less than the voltage between terminals 12 and 14, it is easier to select the value of resistor 34 to be close to a maximum power point than is the case for the voltage between terminals 12 and 14.

Because the threshold voltage of Zener diode 36 is less than the threshold voltage of Zener diode 35, power is supplied to terminal 17 prior to power being applied to terminal 16, as the amount of solar energy incident on panel 11 increases. Therefore, maximum power point sensor 26, function generator 27 and inverter 28 receive power and are in an operational condition prior to power being applied to the inverter by terminal 16, to provide an orderly relatively low transient transfer of power from panel 11 to load 25.

Similarly, as the amount of energy incident on panel 11 decreases, Zener diode 35 is activated into a cut off condition prior to Zener diode 36 being cut off. The presence of maximum power point sensor 26 and the proper selection of the values of resistors 33 and 34, however, provide for the hysteresis effect, whereby Zener diode 35 is switched off in response to a lower intensity of solar energy incident on panel 11 than the intensity required to activate the Zener diode into a conducting state.

This result is seen from curves 18 and 71, FIG. 2, respectively representing the characteristics of solar panel 11 for differing amounts of incident solar radiation, at the same temperature. In FIG. 2, the threshold voltage of Zener diode 35 is indicated by the horizontal line 72, having a value of $V_{z1}$. Assume that panel 11 is illuminated so its output characteristic is indicated by curve 18 and that transistor 31 is cut off. Also assume that the load of panel 11 comprises resistor 33 and the relatively constant load across terminals 17 and 14. Such a load is indicated by load line 73 which intersects threshold line 72 of Zener diode 35 on portion 22 of curve 18. Becuase the threshold voltage of Zener diode 35, load line 73 and curve 18 coincide a slight increase in incident solar energy on panel 11 causes the threshold of Zener diode 35 to be exceeded, whereby transistors 31 and 58 are respectively activated to conducting the cut off states. When transistor 31 conducts, maximum power point sensor 26 causes the load line to shift from load line 73 to load line 74, which intersects maximum power point 23 on curve 18. The load line shift from line 73 to line 74 results in an increased output voltage of panel 11, from line 72 to line 75, a horizontal line intersecting maximum power point 23. If there is a sudden, slight drop in the solar energy incident on panel 11 after the threshold of Zener diode 35 is reached, the output of panel 11 remains sufficiently high to maintain diode 35 in a conducting state, whereby power continues to be applied to the load at terminal 16 through transistor switch 31. The threshold of diode 35 is exceeded until the solar energy incident on panel 11 is such that the panel output characteristic is indicated by curve 71, having a maximum power point 76 at the intersecting threshold voltage line 72 of Zener diode 35. Because of the manner in which maximum power point sensor 26 operates in connection with function generator 27 and inverter 28, the output voltage of panel 11 is determined by the loci of maximum power points for the family of panel current versus voltage curves. Because maximum power point 76 for characteristic curve 71 is lower than the maximum power point 23 for curve 18, hysteresis for the operation of switching transistor 31 is automatically provided.

In accordance with another embodiment of the invention, power is simultaneously applied to terminals 16 and 17. To this end, the circuit of FIG. 3 is modified as indicated in FIG. 4. In FIG. 4, the anodes of Zener diodes 35 and 36 are connected together, and the diodes are selected so the thresholds thereof are as close as possible to each other. Thereby, the voltages across resistors 38 and 39 simultaneously jump from a zero to a finite value as the amount of solar energy incident on panel 11 increases. Similarly, as the amount of solar energy incident on panel 11 decreases, the voltages across resistors 38 and 39 simultaneously vary from a positive to a zero value. In response to the voltage across resistors 38 and 39 simultaneously varying from a zero value to a finite value and vice versa, resistors 33 and 34 are simultaneously connected in shunt with and are decoupled from terminals 12 and 13, and transistors 31 and 32 are simultaneously activated and deactivated into a conducting and non-conducting state. Substantially the same hysteresis effect occurs with the system of FIG. 4 as in the system of FIG. 3 because resistors 33 and 34 in the former cause solar panel 11 to operate along high slope segment 22 at the time the amount of incident energy on the solar panel causes the voltages across resistors 38 and 39 to jump from a zero to a finite level.

While there have been described and illustrated several specific embodiments of the invention, it will be clear that variations in the details of the embodiments specifically illustrated and described may be made without departing from the true spirit and scope of the invention as defined in the appended claims. For example, an indication of the incident solar energy on panel 11 can be derived by monitoring the output current of the panel and comparing it with a reference. In such an instance, the values of dummy loads 33 and 34 are selected so that the load line intersects portion 21 of curve 18 having a slope less than one.

What is claimed is:

1. A circuit for selectively supplying power from a photovoltaic solar panel d.c. source to a main load and control circuitry for the load comprising a first series switch between the source and the main load for selectively supplying voltage having one level to the main load, a second series switch between the source and the circuitry for selectively supplying voltage having a level less than that of the one level to the circuitry, means responsive to the voltage level derived from the source for controlling said switches so that the first and second switches respectively supply power to the main load and the circuitry in response to the voltage level exceeding a predetermined value, means responsive to the voltage level for respectively connecting first and second dummy loads in shunt with the source while the first and second switches do not supply power to the main load and the circuitry and for respectively decoupling the first and second dummy loads from the source while the first and second switches supply power to the load and the circuitry, whereby power from the source is dissipated in the first and second dummy loads while the first and second switches do not supply power to the load, respectively, and means for respectively connecting the first and second switches in circuit with the first and second dummy loads so the dissipate power in the first and second dummy loads is respectively available to be supplied to the main loads is respectively available to be supplied to the main load and circuitry as the first and second switches respectively supply power to the main load and circuitry.

2. The circuit of claim 1 wherein the values of the dummy loads are such that the panel operates along a portion of its output voltage-current characteristic that is substantially displaced from a maximum power point of the characteristic for levels of solar energy incident on the panel immediately below the voltage level that causes the first switch to supply power from the panel to the load.

3. The circuit of claim 2 further including means for causing the panel to operate at the maximum power point while the first switch supplies power from the panel to the load.

4. The circuit of claim 3 wherein the means for causing the panel to operate at the maximum power point includes means responsive to the panel output voltage for deriving a signal indicative of whether the panel is operating at the maximum power point, an inverter for chopping power derived from the first switch and for coupling the chopped power to an a.c. load, said inverter having a response such that the current supplied by it to the load increases as the fundamental frequency of the chopped power increases, and means responsive to the signal for controlling the fundamental frequency.

5. The circuit of claim 1, or 2, or 3, or 4, wherein the means for controlling the first and second switches includes means responsive to differing voltage levels of the source so that the first and second switches respectively couple power from the source to the main load and circuitry in response to the source voltage levels having first and second values.

6. The circuit of claim 1, or 2, or 3, or 4, wherein the means for controlling the first and second switches includes means responsive to the same voltage level of the source so that the first and second switches respectively couple power from the source to the main load and circuitry in response to the source voltage levels having the same values.

7. A circuit for selectively supplying power from a photovoltaic solar panel d.c. source to a load comprising a series switch between the source and the load for selectively supplying power to the load, means responsive to the voltage level derived from the source for controlling said switch so that the switch supplies power to the load in response to the voltage level exceeding a predetermined value, and means responsive to the voltage level for connecting a dummy load in shunt with the source while the switch does not supply power to the load and for decoupling the dummy load from the source while the switch supplies power to the load, whereby power from the source is dissipated in the dummy load while the switch does not supply power to load, and means for connecting the switch in circuit with the dummy load so the dissipated power in the dummy load is available to be supplied to the load as the switch supplies power to the load.

8. The circuit of claim 7 wherein the value of the dummy load is such that the panel operates along a portion of its output voltage-current characteristic that is substantially displaced from a maximum power point of the characteristic for levels of solar energy incident on the panel immediately below the voltage level that causes the switch to supply power from the panel to the load.

9. The circuit of claim 8 further including means for causing the panel to operate at the maximum power point while the switch supplies power from the panel to the load.

10. The circuit of claim 9 wherein the means for causing the panel to operate at the maximum power point includes means responsive to the panel output voltage for deriving a signal indicative of whether the panel is operating at the maximum power point, an inverter for chopping power derived from the switch and for coupling the chopped power to an a.c. load, said inverter having a response such that the current supplied by it to the load increases as the fundamental frequency of the chopped power increases, and means responsive to the signal for controlling the fundamental frequency.

11. A system for providing orderly control of the power applied by a photovoltaic solar panel d.c. source to a load comprising a power inverter selectively responsive to power from the source, an inverter control circuit responsive to voltage from the source for controlling the switching frequency of the inverter so that approximately maximum power is supplied by the panel to the inverter for the incident solar energy on and temperature of the panel, and means responsive to the level of the voltage generated by the panel for coupling power from the panel to the inverter and for preventing coupling of power from the panel to the inverter in response to the voltage level be greater than a predetermined value and less than a predetermined value, respectively.

12. The system of claim 11 wherein the inverter control circuit includes a power supply terminal, and means responsive to the level of voltage generated by the panel for coupling power from the panel to the terminal and for preventing coupling of power from the panel to the terminal in response to the voltage level being greater than a predetermined value and less than a predetermined value, respectively.

13. The system of claim 12 wherein the means for coupling and decoupling for the inverter and terminal includes a first series switch between the source and the inverter for selectively supplying voltage having one level to the inverter, a second series switch between the source and the terminal for selectively supplying voltage having a level less than that of the one level to the terminal, means responsive to the voltage level derived from the source for controlling said switches so that the first and second switches respectively supply power to the inverter and the terminal in response to the voltage level exceeding a predetermined value, means responsive to the voltage level for respectively connecting first and second dummy loads in shunt with the source while the first and second switches do not supply power to the inverter and the terminal and for respectively decoupling the first and second dummy loads from the source while the first and second switches supply power to the inverter and the terminal, whereby power from the source is dissipated in the first and second dummy loads while the first and second switches do not supply power to the inverter, respectively, and means for respectively connecting the first and second switches in circuit with the first and second dummy loads so the dissipated power in the first and second dummy loads is respectively available to be supplied to the inverter and terminal as the first and second switches respectively supply power to the inverter and terminal.

14. The system of claim 13 wherein the values of the dummy loads are such that the panel operates along a portion of its output voltage-current characteristic that is substantially displaced from a maximum power point of the characteristic for levels of solar energy incident on the panel immediately below the voltage level that causes the first switch to supply power from the panel to the load.

15. The system of claim 13 or claim 14 wherein the means for controlling the first and second switches includes means responsive to differing voltage levels of the source so that the first and second switches respectively couple power from the source to the inverter and terminal in response to the source voltage levels having first and second values.

16. The system of claim 11 wherein the means for coupling and decoupling includes a series switch between the source and the invertor for selectively supplying power to the inverter, means responsive to the voltage level derived from the source for controlling said switch so that the switch supplies power to the inverter in response to the voltage level exceeding a predetermined value, and means responsive to the voltage level for connecting a dummy load in shunt with the source while the switch does not supply power to the inverter and for decoupling the dummy load from the source while the switch supplies power to the inverter, whereby power from the source is dissipated in the dummy load while the switch does not supply power to the inverter and the power dissipated from the source in the dummy load is available to be supplied to the inverter as the switch supplies power to the inverter.

17. The system of claim 11 wherein the inverter control circuit includes means for increasing the source voltage level while the source is coupled to the inverter relative to the source voltage while power is prevented from being coupled from the source to the inverter, whereby a hysteresis effect is provided.

18. The system of claim 17 wherein the inverter control circuit for providing the hysteresis effect includes a dummy load for loading the source only while the source is decoupled from the load.

19. The system of claim 18 wherein the value of the dummy load is such that the panel operates along a portion of its output voltage-current characteristic that is substantially displaced from a maximum power point of the characteristic for levels of solar energy incident on the panel immediately below the voltage level that causes the switch to supply power from the panel to the load.

20. The system of claim 19 further including means for causing the panel to operate at the maximum power point while the switch supplies power from the panel to the load.

21. The system of claim 20 wherein the means for causing the panel to operate at the maximum power point includes means responsive to the panel output voltage for deriving a signal indicative of whether the panel is operating at the maximum power point, an inverter for chopping power derived from the switch and for coupling the chopped power to an a.c. load, said inverter having a response such that the current supplied by it to the load increases as the fundamental frequency of the chopped power increases, the means responsive to the signal for controlling the fundamental frequency.

22. A method of controlling the application of d.c. output power of a photovoltaic solar panel to a load comprising determining whether a panel output parameter value is above or below a predetermined threshold, in response to the output parameter value being below the threshold loading the panel with an impedance that causes the panel to derive the output parameter with a value different from the parameter value at the maximum power point for the panel at the threshold while decoupling the panel from the load, in response to the output parameter value being above the threshold coupling the panel to the load while operating the panel substantially at the maximum power point for the panel.

23. The method of claim 22 wherein the parameter value is voltage.

24. A method of controlling the application of d.c. output power of a photovoltaic solar panel to a load comprising monitoring an output parameter of the panel to indicate whether the solar energy incident on the panel is above or below a threshold value, in response to the parameter indicating that the incident energy is below the threshold connecting a dummy load to the panel while preventing the coupling of power from the panel to the load, the dummy load causing the output power of the panel to differ from the panel maximum power at the threshold value of the incident energy, in response to the parameter indicating that the incident energy is above the threshold disconnecting the dummy load from the panel while coupling power from the panel to the load and maximizing the power output of the panel.

25. Apparatus for controlling the application of d.c. output power of a photovoltaic solar panel to a load comprising a dummy load for the panel, means responsive to the value of an output parameter of the panel being below a threshold level for coupling the dummy load to the panel while decoupling the panel from the load, the dummy load having a value that causes the panel to derive an output parameter having a value lower than the parameter value at the maximum power point for the panel at the threshold, means responsive to the output parameter having a value above the threshold level for coupling the panel to the load and decoupling the dummy load from the panel and for operating the panel at the maximum power point for the panel.

26. Apparatus for controlling the application of d.c. output power of photovoltaic solar panel to a load comprising means responsive to a parameter of the panel output for deriving a signal indicative of whether the solar energy incident on the panel is above or below a threshold value, a dummy load, means responsive to the signal indicating that the incident energy is below the threshold for connecting the dummy load to the panel while preventing the coupling of power from the panel to the load, the dummy load causing the output power of the panel to differ from the panel maximum power at the threshold value of the incident energy, and means responsive to the signal indicating that the incident energy is above the threshold for disconnecting the dummy load from the panel while coupling power from the panel to the load and for maximizing the power output of the panel.

27. The apparatus of claim 25 or 26 wherein said means for coupling power to the load includes a function generator having a variable frequency output that is stabilized when the load is operating at the maximum power point of the panel, and a power inverter switched by the variable frequency output for coupling power from the panel to the motor, the function generator causing the inverter to chop the panel d.c. output into a notched, mutli-level pseudo sinusoidal wave having frequencies above and below the stabilized frequency in response to load currents greater and less than the load current at the maximum power point.

* * * * *